United States Patent
Kozuka et al.

(10) Patent No.: US 10,301,402 B2
(45) Date of Patent: May 28, 2019

(54) DISPERSION STABILIZER FOR SUSPENSION POLYMERIZATION, PRODUCTION METHOD FOR VINYL-BASED POLYMER, AND VINYL CHLORIDE RESIN

(71) Applicant: Japan Vam & Poval Co., Ltd., Osaka (JP)

(72) Inventors: Yoshiaki Kozuka, Osaka (JP); Takehiro Omori, Osaka (JP)

(73) Assignee: Japan Vam & Poval Co., Ltd., Osaka (JP)

( * ) Notice: Subject to any disclaimer, the term of this patent is extended or adjusted under 35 U.S.C. 154(b) by 0 days.

(21) Appl. No.: 15/313,766

(22) PCT Filed: May 26, 2015

(86) PCT No.: PCT/JP2015/064983
§ 371 (c)(1),
(2) Date: Nov. 23, 2016

(87) PCT Pub. No.: WO2015/182567
PCT Pub. Date: Dec. 3, 2015

(65) Prior Publication Data
US 2017/0198068 A1    Jul. 13, 2017

(30) Foreign Application Priority Data
May 28, 2014   (JP) .................. 2014-110041

(51) Int. Cl.
*C08F 8/28* (2006.01)
*C08F 16/06* (2006.01)
*C08F 2/20* (2006.01)
*C08F 14/06* (2006.01)
*C08F 214/08* (2006.01)

(52) U.S. Cl.
CPC .............. *C08F 8/28* (2013.01); *C08F 2/20* (2013.01); *C08F 14/06* (2013.01); *C08F 16/06* (2013.01); *C08F 214/08* (2013.01)

(58) Field of Classification Search
CPC .......... C08F 2/20; C08F 216/06; C08F 16/06
See application file for complete search history.

(56) References Cited

U.S. PATENT DOCUMENTS

| | | | | |
|---|---|---|---|---|
| 2002/0077416 A1* | 6/2002 | Hara | .................... | C04B 20/1033 525/57 |
| 2003/0092835 A1 | 5/2003 | Kato et al. | | |
| 2009/0111940 A1* | 4/2009 | Kato | .................... | B01F 17/0028 525/60 |
| 2009/0118424 A1* | 5/2009 | Stark | .................... | C08F 8/28 525/56 |
| 2010/0041828 A1 | 2/2010 | Kato et al. | | |
| 2013/0040134 A1 | 2/2013 | Dufour et al. | | |
| 2013/0324655 A1 | 12/2013 | Yoshii | | |

FOREIGN PATENT DOCUMENTS

| | | | |
|---|---|---|---|
| CN | 102762793 | A | 10/2012 |
| EP | 1 300 421 | A1 | 4/2003 |
| EP | 2 006 307 | A1 | 12/2008 |
| EP | 2 154 161 | A1 | 2/2010 |
| GB | 915621 | | 1/1963 |
| GB | 990598 | | 4/1965 |
| JP | 1972041727 | * | 10/1972 |
| JP | 55-115402 | A | 9/1980 |
| JP | 58-002962 | A | 1/1983 |
| JP | 58-191702 | A | 11/1983 |
| JP | 06-287387 | A | 10/1994 |
| JP | 07-278209 | A | 10/1995 |
| JP | 08-259609 | A | 10/1996 |
| JP | 09-077807 | A | 3/1997 |
| JP | 2004-189889 | A | 7/2004 |
| JP | 2004-196892 | A | 7/2004 |
| JP | 2006-241448 | A | 9/2006 |
| WO | WO 2007/119735 | A1 | 10/2007 |
| WO | WO 2012/114441 | A1 | 8/2012 |

OTHER PUBLICATIONS

Nagano, Koichi "Poval" 1981, pp. 246-249, Kobunshi Kankokai.
International Search Report for PCT/JP20015/064983 dated Aug. 4, 2015.
Supplementary European Search Report for EP 15799690 dated Nov. 9, 2017.
International Preliminary Report on Patentability for PCT/JP2015/064983 dated Nov. 29, 2016.
Office Action in Chinese Patent Application No. 201580027583.X dated Sep. 1, 2017.

* cited by examiner

*Primary Examiner* — Mark S Kaucher
(74) *Attorney, Agent, or Firm* — Knobbe Martens Olson & Bear LLP

(57) ABSTRACT

Provided is a dispersion stabilizer which exhibits an excellent polymerization stability when used in suspension polymerization for a vinyl chloride-based resin, and gives a vinyl chloride-based resin having few coarse particles, few fish eyes after resin molding, an excellent plasticizer absorption, and an excellent hue. Also provided is a high-quality vinyl chloride-based resin produced using the dispersion stabilizer. The present invention is a dispersion stabilizer for suspension polymerization containing a polyvinyl alcohol-based polymer (B) which has a double bond in a side chain and which is obtainable by acetalization of a polyvinyl alcohol-based polymer (A) with a monoaldehyde having an olefinic unsaturated double bond.

5 Claims, No Drawings

US 10,301,402 B2

DISPERSION STABILIZER FOR SUSPENSION POLYMERIZATION, PRODUCTION METHOD FOR VINYL-BASED POLYMER, AND VINYL CHLORIDE RESIN

CROSS REFERENCE TO RELATED APPLICATIONS

This application is a U.S. National Phase Application of PCT International Application Number PCT/JP2015/064983, filed on May 26, 2015, designating the United States of America, which is an International Application of and claims the benefit of priority to Japanese Patent Application No. 2014-110041, filed on May 28, 2014. The disclosures of the above-referenced applications are hereby expressly incorporated by reference in their entireties.

TECHNICAL FIELD

The present invention relates to a dispersion stabilizer to be used in suspension polymerization of a vinyl-based monomer, in particular, a dispersion stabilizer to be used in suspension polymerization of a vinyl chloride-based monomer. In more detail, the present invention relates to a dispersion stabilizer which allows stable polymerization and gives a vinyl chloride-based resin having excellent physical properties, and a vinyl chloride resin produced with use of the dispersion stabilizer.

BACKGROUND ART

As a method for industrial production of a vinyl chloride-based resin, generally employed is batch suspension polymerization, in which a vinyl-based monomer, such as vinyl chloride, is dispersed in an aqueous solvent in the presence of a dispersion stabilizer, and subjected to polymerization with use of an oil-soluble polymerization initiator. In a polymerization process, the quality of such a vinyl chloride-based resin is controlled by various factors, for example, the polymerization rate, the ratio of the aqueous solvent to the monomer, the polymerization temperature, the kind and the amount of the polymerization initiator, the type of the polymerization tank, the stirring rate, and the kind and the amount of the dispersion stabilizer. Among them, the dispersion stabilizer has a significant influence.

The role of the dispersion stabilizer in suspension polymerization for a vinyl chloride-based resin is to disperse a monomer in an aqueous solvent, to give stable droplets, to uniformize the sizes of the droplets repeating dispersion and adhesion, and to control the cohesiveness of polymerized particles. Accordingly, the dispersion stabilizer needs to have, for example, the following properties:
(1) to give vinyl chloride resin particles having a sharp particle size distribution,
(2) to give porous particles of the vinyl chloride-based resin having an excellent plasticizer absorption property and an excellent molding processability,
(3) to give vinyl chloride-based resin particles having a porosity within a certain range to facilitate the removal of residual monomers,
(4) to give vinyl chloride-based resin particles having a higher bulk specific gravity to improve the processability of the vinyl chloride-based resin, and the like.
That is, the required performances of the dispersion stabilizer are, in summary, to exhibit an excellent dispersion ability even when used in a small quantity, and to appropriately control the particle diameter, the particle form, etc. of a vinyl chloride-based resin.

Generally, as the dispersion stabilizer, polyvinyl alcohol-based resins (hereinafter, polyvinyl alcohol may be abbreviated as PVA), cellulose derivatives, and the like are used alone or in combination thereof as appropriate. In particular, PVA-based polymers are the most widely used. However, such materials do not sufficiently meet the above requirements of the performances, and various examinations have been continuously carried out.

For example, Non-patent Literature 1 discloses a method where a dispersion stabilizer for suspension polymerization of vinyl chloride is a PVA which has a viscosity-average polymerization degree of 2000 and a saponification degree of 88 or 80 mol % and which is considered to have a high emulsifying capacity, or a PVA which has a viscosity-average polymerization degree of 600 to 700 and a saponification degree of around 70 mol % and precipitates at the polymerization temperature for the vinyl chloride-based resin.

Moreover, Patent Literature 1 discloses a method where polyvinyl acetate obtained by polymerization in the presence of aldehydes is subjected to saponification to give a PVA, sodium acetate is added to the PVA, the mixture is subjected to heat treatment to give a PVA having a polymerization degree of 1500 or less, a saponification degree of 90 mol % or less, and a carbonyl group and two or three vinylene groups linking with one another in a molecule, and the PVA is used as a dispersion stabilizer for suspension polymerization of vinyl chloride.

Furthermore, Patent Literature 2 discloses, as a dispersion stabilizer for suspension polymerization of vinyl chloride, a specific PVA of which a 0.1% by weight aqueous solution shows an absorbance of a certain value or higher at a wavelength of 280 nm and 320 nm, the absorbance being an index showing the amount of vinylene group contained in the molecule, and of which the ratio of the absorbance at 320 nm to the absorbance at 280 nm is a certain value or greater.

However, the PVAs described in the literature (Patent Literature 1 and Patent Literature 2) are PVAs previously subjected to heat treatment, and when heat-treated PVAs are used in suspension polymerization of vinyl chloride, the effect is not always satisfying in view of polymerization stability. For improvement of polymerization stability, the use of PVA previously subjected to strong heat treatment is required, but strong heat treatment induces yellowing in PVA and therefore, the resulting vinyl chloride resin (PVC resin) is not good in hue. Moreover, the PVA has a high block character, leading to reduction in dispersion performance, and thus, a porous vinyl chloride resin is difficult to obtain.

In addition, the use of various kinds of modified PVA, such as an ethylene-modified PVA (Patent Literature 3), a PVA having 1,2-diol in a side chain (Patent Literature 4), a PVA having a hydroxyalkyl group having 1 to 20 carbon atoms (Patent Literature 5) as a dispersion stabilizer has been examined. However, also in cases where these dispersion stabilizers are used in suspension polymerization of vinyl chloride, the effect is not satisfying in view of polymerization stability.

Moreover, a PVA esterified with a carboxylic acid having an unsaturated double bond (Patent Literature 6) has been examined. However, also in cases where the PVA is used as a dispersion stabilizer for suspension polymerization of vinyl chloride, the effect is not satisfying in view of polymerization stability, due to the strong hydrophilicity of carboxylic acids and carboxylic acid esters.

CITATION LIST

Patent Literature

Patent Literature 1: JP S58-2962 B
Patent Literature 2: JP 2004-189889 A
Patent Literature 3: JP H8-259609 A
Patent Literature 4: JP 2006-241448 A
Patent Literature 5: JP H9-77807 A
Patent Literature 6: WO 2007/119735

Non-Patent Literature

Non-patent Literature 1: "Poval", Kobunshi Kankokai, issued in 1981

SUMMARY OF INVENTION

Technical Problem

Considering the above problems, and thus an object of the present invention is to provide a dispersion stabilizer which exhibits an excellent polymerization stability when used in polymerization for a vinyl chloride-based resin, and gives a vinyl chloride-based resin having few coarse particles, few fish eyes after resin molding, an excellent plasticizer absorption, and an excellent hue. Another object of the present invention is to provide a high-quality vinyl chloride-based resin produced using the dispersion stabilizer.

Solution to Problem

In order to solve the above problems, the present inventors carried out earnest investigations, and consequently found that the above problems can be solved with a dispersion stabilizer containing a polyvinyl alcohol-based polymer (B) which has a double bond in a side chain and which is obtainable by acetalization of a polyvinyl alcohol-based polymer (A) with a monoaldehyde having an olefinic unsaturated double bond. The present inventors conducted further examination and completed the present invention.

That is, the present invention relates to the following dispersion stabilizer, etc.

[1] A dispersion stabilizer for suspension polymerization, containing a polyvinyl alcohol-based polymer (B) which has a double bond in a side chain and which is obtainable by acetalization of a polyvinyl alcohol-based polymer (A) with a monoaldehyde having an olefinic unsaturated double bond.

[2] The dispersion stabilizer for suspension polymerization according to the above [1], wherein the modification rate of the polyvinyl alcohol-based polymer (B) which has a double bond in a side chain and which is modified by the monoaldehyde having an unsaturated double bond is 0.01 to 20 mol % per monomer unit of the polyvinyl alcohol-based polymer (A).

[3] The dispersion stabilizer for suspension polymerization according to the above [1] or [2], wherein the polyvinyl alcohol-based polymer (B) has a saponification degree of 60 to 99.9 mol % and an average polymerization degree of 300 to 5000.

[4] The dispersion stabilizer for suspension polymerization according to any one of the above [1] to [3], wherein the polyvinyl alcohol-based polymer (B) has a block character of 0.5 or less.

[5] A method for producing a vinyl polymer, the method comprising suspension polymerization of a vinyl-based monomer using the dispersion stabilizer for suspension polymerization according to any one of the above [1] to [4].

[6] A vinyl chloride resin produced by suspension polymerization of a vinyl chloride-based monomer using the dispersion stabilizer for suspension polymerization according to any one of the above [1] to [4].

Advantageous Effects of Invention

By use of the dispersion stabilizer for suspension polymerization of the present invention, polymerization can be stably performed, and therefore an excellent effect of reducing blocking of a resin and scale adhesion to the inner wall of a polymerization tank, which are caused by unstable polymerization, can be exhibited.

Moreover, the dispersion stabilizer for suspension polymerization of the present invention is extremely excellent in an ability of stably dispersing a vinyl chloride-based monomer in an aqueous medium, and therefore the use of the dispersion stabilizer even in a small amount allows well-stable suspension polymerization. Accordingly, the resulting vinyl chloride-based resin has few coarse particles, a sharp particle size distribution, an excellent hue, a high bulk specific gravity. Moreover, the resin has an excellent plasticizer absorption because it has porosity, and few fish eyes after resin molding due to the uniform porosity.

Furthermore, by the use of the dispersion stabilizer for suspension polymerization of the present invention, yellowing of polyvinyl alcohol-based polymers contained in the dispersion stabilizer is significantly reduced, and thus the dispersion stabilizer is extremely useful for production of a high-quality vinyl chloride-based resin in which deterioration in the hue and transparency derived from the hue of the dispersion stabilizer is significantly improved.

DESCRIPTION OF EMBODIMENTS

The present invention will be described in detail below.

The dispersion stabilizer for suspension polymerization of the present invention comprises a polyvinyl alcohol-based polymer (B) which has a double bond in a side chain and which is obtainable by acetalization of a polyvinyl alcohol-based polymer (A) with a monoaldehyde having an olefinic unsaturated double bond.

The monoaldehyde having an olefinic unsaturated double bond used in the present invention is not particularly limited, and examples thereof include unsaturated monoaldehydes, such as acrolein, crotonaldehyde, methacrolein, 3-butenal, 2,4-pentadienal, 3-methyl-2-butenal, 2-methyl-2-butenal, 2-pentenal, 3-pentenal, 4-pentenal, 2,4-hexadienal, 2-hexenal, 3-hexenal, 4-hexenal, 5-hexenal, 2-ethylcrotonaldehyde, 2-methyl-2-pentenal, 3-(dimethylamino)acrolein, 2,6-nonadienal, cinnamaldehyde, myristoleic aldehyde, palmitoleic aldehyde, oleic aldehyde, elaidic aldehyde, vaccenic aldehyde, gadoleic aldehyde, erucic aldehyde, nervonic aldehyde, linoleic aldehyde, linolenic aldehyde, eleostearic aldehyde, stearidonic aldehyde, arachidonic aldehyde, eicosapentaenoic aldehyde, citral, citronellal, α-methylcinnamaldehyde, and the like. Moreover, if the monoaldehyde has a cis isomer and a trans isomer, both isomers can be used. Such monoaldehydes having an olefinic unsaturated double bond can be used alone or in combination of two or more kinds.

Dialdehydes and polyvalent aldehydes are not preferred because they may unfavorably insolubilize the polyvinyl alcohol-based polymer (B) obtained after acetalization.

In the acetalization, combination use of monoaldehydes not having any olefinic unsaturated double bond, such as aliphatic aldehydes including formaldehyde, acetaldehyde, propionaldehyde, butyraldehyde, valeraldehyde, hexanal, and the like, and aromatic aldehydes including benzaldehyde, tolualdehyde, and the like is also possible.

Polyvinyl Alcohol-Based Polymer (A)

A polyvinyl alcohol-based polymer (A) (hereinafter, polyvinyl alcohol-based polymer may be abbreviated as PVA-based polymer) used for the dispersion stabilizer of the present invention is not particularly limited, and, for example, a PVA-based polymer (A) obtained by saponification of a vinyl ester-based polymer can be used.

The vinyl ester-based polymer can be obtained by polymerization of a vinyl ester-based monomer. The polymerization method is not particularly limited and may be a conventionally known method, for example, bulk polymerization, solution polymerization, suspension polymerization, emulsion polymerization, or the like. In view of the control of the polymerization degree and the saponification after polymerization, solution polymerization using methanol as a solvent and suspension polymerization using water or water/methanol as a dispersion medium are preferred, but the polymerization method is not limited to them.

The vinyl ester-based monomer which can be used in the polymerization is not particularly limited, and examples thereof include vinyl acetate, vinyl formate, vinyl propionate, vinyl caprylate, vinyl versatate, and the like. From the industrial viewpoint, vinyl acetate is preferred among them.

In the polymerization of a vinyl ester-based monomer, the vinyl ester-based monomer may be copolymerized with another kind of monomer as long as the effect of the present invention is exhibited. Said another kind of monomer is not particularly limited, and examples thereof include α-olefins, such as ethylene, propylene, n-butene, and isobutylene; acrylic acid and salts thereof; acrylic esters, such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate, and octadecyl acrylate; methacrylic acid and salts thereof; methacrylic esters, such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, dodecyl methacrylate, and octadecyl methacrylate; acrylamide derivatives, such as acrylamide, N-methylacrylamide, N-ethylacrylamide, N,N-dimethylacrylamide, diacetone acrylamide, acrylamide propane sulfonate and salts thereof, acrylamidopropyldimethylamine and salts or quaternary salts thereof, and N-methylolacrylamide and its derivatives; methacrylamide derivatives, such as methacrylamide, N-methylmethacrylamide, N-ethylmethacrylamide, methacrylamide propane sulfonate and salts thereof, methacrylamidopropyldimethylamine and salts or quaternary salts thereof, N-methylolmethacrylamide and its derivatives; vinyl ethers, such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, and stearyl vinyl ether; nitriles, such as acrylonitrile and methacrylonitrile; vinyl halides, such as vinyl chloride and vinyl fluoride; vinylidene halides, such as vinylidene chloride and vinylidene fluoride; allylic compounds, such as allyl acetate and allyl chloride; unsaturated dicarboxylic acids, such as maleic acid, itaconic acid, and fumaric acid, and salts or esters thereof; vinylsilyl compounds, such as vinyltrimethoxysilane; isopropenyl acetate; and the like.

In the polymerization of a vinyl ester-based monomer, a chain transfer agent may be added for the purpose of the control of the polymerization degree of the resulting vinyl ester-based polymer, or the like. The chain transfer agent is not particularly limited, and examples thereof include aldehydes, such as acetaldehyde, propionaldehyde, butyraldehyde, and benzaldehyde; ketones, such as acetone, methyl ethyl ketone, hexanone, and cyclohexanone; mercaptans, such as 2-hydroxyethanethiol and dodecylmercaptan; and organic halogens, such as carbon tetrachloride, trichloroethylene, and perchloroethylene. Among them, aldehydes and ketones are suitably used. The amount of the chain transfer agent added is determined depending on the chain transfer constant of the chain transfer agent and the intended polymerization degree of the vinyl ester-based polymer, and is generally preferably 0.1 to 10% by weight relative to the vinyl ester-based monomer.

A PVA-based polymer (A) can be produced by subjecting the vinyl ester-based polymer obtained as described above to saponification. The saponification method of the vinyl ester-based polymer is not particularly limited, and may be a conventionally known method. For example, conventionally known alcoholysis or hydrolysis reaction using a basic catalyst, such as sodium hydroxide, potassium hydroxide, and sodium methoxide, or an acidic catalyst, such as p-toluenesulfonic acid, can be applied. Examples of the solvent used in the saponification include alcohols, such as methanol and ethanol; esters, such as methyl acetate and ethyl acetate; ketones, such as acetone and methyl ethyl ketone; aromatic hydrocarbons, such as benzene and toluene, and these can be used alone or in combination of two kinds or more. In particular, it is easy and preferable to carry out saponification using methanol or a mixed solution of methanol and methyl acetate as the solvent in the presence of sodium hydroxide as a basic catalyst.

The saponification degree of the PVA-based polymer (A) is not particularly limited, but the saponification degree measured by the method specified in JIS K 6726 is preferably 60 to 99.9 mol %, and more preferably 65 to 99.9 mol %. When the saponification degree is too low, the PVA-based polymer (A) is less likely to dissolve in water, and can fail to serve as a dispersion stabilizer in an aqueous solvent.

Moreover, the polymerization degree of the PVA-based polymer (A) is also not particularly limited, but the polymerization degree measured by the method for measurement of an average polymerization degree of the PVA specified in JIS K 6726 is preferably 300 to 5000, more preferably 350 to 4000, and further preferably 400 to 2500.

When the polymerization degree of the PVA-based polymer (A) is too low, the dispersion performance as a dispersion stabilizer of the present invention can be reduced. When the polymerization degree of the PVA-based polymer (A) is too high, the viscosity of the aqueous solution in which the PVA-based polymer (A) is dissolved is high and therefore the solution is difficult to handle. Moreover, such a high polymerization degree leads to an unfavorably high viscosity of the dispersion medium in suspension polymerization, which may result in adverse effect on the polymerization.

The block character of the residual acetic acid groups in the PVA-based polymer (A) is preferably 0.5 or less, more preferably 0.3 to 0.5, and further preferably 0.35 to 0.45.

Herein, the block character ($\eta$) of the residual acetic acid groups is an index showing the distribution of the residual acetic acid groups of a PVA-based polymer, and is obtained by analysis of three peaks appearing in the methylene region of a 13C NMR spectrum. The three peaks correspond to the three kinds of dyads of (OH, OH), (OH, OAc), and (OAc, OAc), and the ratio of the absorption intensities is proportional to the ratio of the three dyads. The block character (η) is represented by the following formula (1).

$$\eta = (OH, OAc)/[2(OH)(OAc)] \quad (1)$$

(wherein, (OH, OAc) denotes the fraction of the dyad (OH, OAc) in which an OH group is adjacent to an OAc group, and is obtained from the relative intensity of the methylene carbon in a 13C NMR spectrum; (OH) denotes the saponification degree expressed in mol percentage; and (OAc) denotes the fraction of the residual acetic acid groups expressed in mol percentage.)

The block character takes a value of 0 to 2. A value closer to 0 means that the residual acetic acid groups exhibit a higher blocking tendency, a value closer to 1 means that OH groups and OAc groups are present in a more random manner, and a value closer to 2 means that OH groups and OAc groups are present in a more highly alternating manner. The block character of the residual acetic acid groups influences dispersibility of a vinyl-based monomer, such as a vinyl chloride monomer. A measurement method for the block character and the like are described in detail in the above-mentioned Non-patent Literature 1, 246-249, and Macromolecules, 10, 532 (1977).

When the block character is higher than 0.5, the plasticizer absorption of a vinyl-based polymer obtained by suspension polymerization using the vinyl alcohol-based polymer is reduced. When the block character is lower than 0.3, an aqueous solution of the vinyl alcohol-based polymer is difficult to handle.

In the present invention, the block character of the residual acetic acid groups of a PVA-based polymer (A) can be adjusted by appropriately selecting the kinds of the saponification catalyst and the solvent, and the like used in the saponification of the vinyl ester-based polymer for the production of a PVA-based polymer (A).

For a block character of 0.5 or less, it is easy and preferable to carryout alkali saponification, in which a basic catalyst is used as a saponification catalyst, with use of a mixed solution of methanol and methyl acetate as a solvent. Acid saponification, in which an acid catalyst is used, provides a too high block character and therefore is not preferred.

Moreover, heating of the resulting PVA-based polymer (A) leads to increase in block character, and therefore excessive heating is not preferred.

Acetalization

In the present invention, the method for acetalization of the PVA-based polymer (A) with a monoaldehyde having an olefinic unsaturated double bond is not particularly limited, and a publicly known acetalization method can be used.

Examples of the method include (i) a method in which a monoaldehyde is dissolved in a PVA-based polymer (A) aqueous solution for reaction in the presence of an acid catalyst, and then the resulting solution is neutralized with a basic substance to give a PVA-based polymer (B); (ii) a method in which, to a slurry or powdery PVA-based polymer (A), a monoaldehyde is directly added, or a liquid in which a monoaldehyde is dissolved or dispersed in an alcohol, such as methanol, ethanol, and propanol, or water is added, an acid catalyst is added to the mixture for reaction, and then the resulting mixture is neutralized with a basic substance and dried for removal of the excessive solvent to give a PVA-based polymer (B); and the like. The PVA-based polymer aqueous solution obtained in the method (i) can be used as it is in suspension polymerization. In the method (ii) in which a slurry PVA-based polymer is reacted, the obtained PVA-based polymer is a solid and therefore easy to handle. In the methods (i) and (ii), each of the method for preparing an aqueous solution of a PVA-based polymer (A) and the methods for neutralization, dissolution, dispersion, and drying is not particularly limited, and can be a conventional method.

In Methods (i) and (ii), the acid catalyst is not particularly limited, and examples thereof include inorganic acids, such as hydrochloric acid, sulfuric acid, nitric acid, and phosphoric acid; organic acids, such as formic acid, acetic acid, oxalic acid, and p-toluenesulfonic acid; and the like.

Moreover, the basic substance used for neutralization is not particularly limited, and examples thereof include alkali metal hydroxides, such as sodium hydroxide and potassium hydroxide; alkali metal carbonates, such as sodium carbonate and potassium carbonate; and the like.

In the present invention, one kind of PVA-based polymer (A) may be used alone, and alternatively, two or more kinds of PVA-based polymers (A) having different properties may be used in combination.

Polyvinyl Alcohol-Based Polymer (B)

Acetalization of the PVA-based polymer (A) obtained as described above with the use of a monoaldehyde having an olefinic unsaturated double bond gives a PVA-based polymer (B) having a double bond in a side chain.

In the present invention, the modification rate of the PVA-based polymer (B) modified by the monoaldehyde which has an unsaturated double bond and which has been introduced for acetalization of the PVA-based polymer (A) is preferably 0.01 to 20 mol %, more preferably 0.05 to 15 mol %, and particularly preferably 0.1 to 10 mol % per monomer unit of the PVA-based polymer (A).

In the present invention, the method for measurement of the modification rate of the PVA-based polymer (B) modified by the monoaldehyde having an unsaturated double bond is not particularly limited, and examples thereof include a method in which the PVA-based polymer (B) is dissolved in a d6-DMSO solvent and subjected to 1H-NMR spectroscopy for analysis of a signal derived from the double bond, a method in which an unreacted monoaldehyde is subjected to high-performance liquid chromatography or gas chromatography for measurement, and the like.

In the present invention, the saponification degree of the PVA-based polymer (B) is not particularly limited, but the saponification degree measured by the method specified in JIS K 6726 is preferably 60 to 99.9 mol %, and more preferably 65 to 99.9 mol %. When the saponification degree is too low, the PVA-based polymer (B) is less likely to dissolve in water, and can fail to serve as a dispersion stabilizer in an aqueous solvent.

The saponification degree of the PVA-based polymer (B) can be adjusted by the saponification degree of the PVA-based polymer (A) as raw material of the PVA-based polymer (B). Preferably, water is contained in the reaction system of the acetalization of the PVA-based polymer (A) with a monoaldehyde for smaller changes in the saponification degree of the PVA-based polymer during the acetalization.

Moreover, the polymerization degree of the PVA-based polymer (B) is also not particularly limited, but the polymerization degree measured by the method for measurement of an average polymerization degree of the PVA specified in JIS K 6726 is preferably 300 to 5000, more preferably 350 to 4000, and further preferably 400 to 2500.

When the polymerization degree of the PVA-based polymer (B) is too low, the dispersion performance as a dispersion stabilizer of the present invention can be reduced. When the polymerization degree of the PVA-based polymer (B) is too high, the viscosity of the aqueous solution in which the PVA-based polymer (B) is dissolved is high and therefore the solution is difficult to handle. Moreover, such a high polymerization degree leads to an unfavorably high viscosity of the dispersion medium in suspension polymerization, resulting in adverse effect on the polymerization.

The polymerization degree of the PVA-based polymer (B) can be adjusted by the polymerization degree of the PVA-based polymer (A) as raw material of the PVA-based polymer (B).

The block character of the residual acetic acid groups in the PVA-based polymer (B) is 0.5 or less, preferably 0.3 to 0.5, and further preferably 0.35 to 0.45. When the block character is higher than 0.5, the plasticizer absorption of a vinyl-based polymer obtained by suspension polymerization using the PVA-based polymer (B) is reduced. When the block character is lower than 0.3, an aqueous solution of the vinyl alcohol-based polymer is difficult to handle.

The block character of the residual acetic acid groups in the PVA-based polymer (B) can be adjusted by the block character of the PVA-based polymer (A) as raw material of the PVA-based polymer (B). Moreover, preferably, water is contained in the reaction system of the acetalization of the PVA-based polymer (A) with a monoaldehyde for smaller changes in the block character of the PVA-based polymer during the acetalization.

Production Method for Vinyl-Based Polymer

Next, the use of the dispersion stabilizer of the present invention comprising the above-described PVA-based polymer (B) and a method for producing a vinyl-based polymer by suspension polymerization of a vinyl-based monomer using the dispersion stabilizer will be described.

The suspension polymerization in the present invention is a polymerization method in which, to an aqueous solvent, a vinyl-based monomer insoluble therein and an oil-soluble polymerization initiator are added, the mixture is stirred for formation of fine droplets containing the vinyl-based monomer, and polymerization is performed in the droplets. The aqueous solvent used herein is not particularly limited, and examples thereof include water, an aqueous solution containing additives, a mixed solvent of water and an organic solvent having compatibility with water, and the like.

The PVA-based polymer (B) in the present invention can be used as a dispersion stabilizer in suspension polymerization of a vinyl-based monomer. The vinyl-based monomer is not particularly limited, and preferable examples thereof include vinyl-based monomers to which suspension polymerization is generally applied, such as vinyl chloride, vinylidene chloride, styrene, an acrylic ester, a methacrylate ester, vinyl acetate, and acrylonitrile. Among them, a vinyl chloride-based monomer is particularly preferred. Examples of the vinyl chloride-based monomer include a vinyl chloride monomer, and a mixture of a vinyl chloride monomer and another kind of monomer which can be copolymerized with the vinyl chloride monomer. Examples of said another kind of monomer which can be copolymerized with the vinyl chloride monomer include monomers such as vinylidene chloride, vinyl acetate, ethylene, propylene, acrylic acid, an acrylic ester, methacrylic acid, a methacrylate ester, styrene, a vinylalkoxysilane, maleic acid, a hydroxyalkyl acrylate, allyl sulfonic acid, and vinyl sulfonic acid.

Therefore, the dispersion stabilizer of the present invention can be suitably used in homopolymerization of vinyl chloride by suspension polymerization. Moreover, the dispersion stabilizer of the present invention can be used in binary copolymerization or multicomponent copolymerization by suspension polymerization of vinyl chloride with one or more monomers selected from publicly known monomers which can be copolymerized with vinyl chloride. The dispersion stabilizer can be suitably used in, in particular, copolymerization of vinyl chloride with vinyl acetate among the above by suspension polymerization.

The polymerization initiator in suspension polymerization of a vinyl-based monomer may also be a publicly known one, and examples thereof include percarbonate compounds, such as diisopropyl peroxydicarbonate, di-(2-ethylhexyl) peroxydicarbonate, and diethoxyethyl peroxydicarbonate; perester compounds, such as benzoyl peroxide, t-butyl peroxyneodecanoate, α-cumyl peroxyneodecanoate, and t-butyl peroxydecanoate; peroxides, such as acetyl cyclohexylsulfonyl peroxide and 2,4,4-trimethylpentyl-2-peroxyphenoxyacetate; azo compounds, such as 2,2'-azobisisobutyronitrile, azobis(2,4-dimethylvaleronitrile), and azobis(4-methoxy-2,4-dimethylvaleronitrile); benzoyl peroxide; lauroyl peroxide; and the like. Moreover, these compounds can also be used in combination with potassium persulphate, ammonium persulphate, hydrogen peroxide, or the like.

The main role of a dispersion stabilizer in suspension polymerization of a vinyl-based monomer is to stabilize droplets comprising a vinyl-based monomer and a polymer thereof, leading to prevention of the generation of a big mass caused by fusion, between the droplets, of polymer particles comprised therein. The dispersion stabilizer of the present invention is excellent in dispersion performance, and therefore the use of the dispersion stabilizer even in a small amount allows formation of stable droplets, leading to prevention of the generation of a mass caused by the fusion.

Stabilization of droplets means that fine droplets with an almost uniform size are stably dispersed in a dispersion medium for suspension polymerization.

In suspension polymerization of a vinyl-based monomer, the amount of the dispersion stabilizer of the present invention is not particularly limited, but is usually 5 parts by weight or less, preferably 0.005 to 1 part by weight, and further preferably 0.01 to 0.2 part by weight relative to 100 parts by weight of the vinyl-based monomer. The dispersion stabilizer of the present invention is generally dissolved in a dispersion medium for suspension polymerization by a conventional method before addition of a vinyl-based monomer, as is the case with a conventional dispersion stabilizer.

In suspension polymerization of a vinyl-based monomer, the dispersion stabilizer of the present invention may be used alone or in combination with another kind of dispersion stabilizer. Examples of said another kind of dispersion stabilizer include publicly known dispersion stabilizers used in suspension polymerization of a vinyl-based monomer, such as vinyl chloride, in an aqueous solvent, for example, a PVA and a modified PVA-based polymer other than the dispersion stabilizer of the present invention having an average polymerization degree of 100 to 4500 and a saponification degree of 30 to 100 mol %; water-soluble cellulose ethers, such as methylcellulose, hydroxyethylcellulose, and hydroxypropylcellulose; water-soluble polymers, such as gelatin; oil-soluble emulsions, such as sorbitan monolaurate, sorbitan trioleate, glycerin tristearate, and an ethylene oxide-propylene oxide block polymer; water-soluble emulsions, such as polyoxyethylene glycerin olate and sodium laurate; and the like. Of these dispersing agents, one kind alone, or two or more kinds in combination may be used.

In the present invention, it is preferable to use, as the dispersion stabilizer, a combination of two or more kinds of PVA-based polymers having different polymerization degrees and saponification degrees, of which one or more kinds are preferably the PVA-based polymers (B) as the dispersion stabilizers of the present invention. More preferably, a PVA-based polymer having a polymerization degree of 1700 or more and a high dispersion stability and a PVA-based polymer having a polymerization degree of 1000 or less are used in combination, and one or more kinds of them are the PVA-based polymers (B) of the present invention.

In the suspension polymerization with use of the dispersion stabilizer of the present invention, various kinds of publicly known dispersion aids can be used in combination with the dispersion stabilizer. As such a dispersion aid, a PVA having a low saponification degree of preferably 30 to 60 mol %, more preferably 30 to 50 mol %, may be used. The dispersion aid is preferably a PVA having an average polymerization degree of preferably 160 to 900 and more preferably 200 to 500.

In addition to the dispersion aid, various kinds of publicly known additives used in suspension polymerization of a vinyl-based compound, such as a chain transfer agent, a polymerization inhibitor, a pH adjuster, a scale inhibitor, and a cross linking agent, may be used in combination with the dispersion stabilizer of the present invention.

The polymerization temperature in suspension polymerization is not limited and can be selected depending on the kind of the vinyl monomer used, polymerization conditions, the intended polymerization yield, and the like, but usually, the inner temperature is preferably 30 to 80° C. The polymerization time is also not particularly limited, and is only required to be appropriately set depending on the intended polymerization degree of the polymer.

The vinyl chloride-based resin obtained by the above-described production method of the present invention has a sharp particle size distribution, a high bulk specific gravity, and an excellent plasticizer absorption, and therefore is excellent in processability into various molded products. Moreover, the vinyl chloride-based resin after molding has few fish eyes and an excellent hue.

EXAMPLES

The present invention will now be specifically described in more detail by way of Examples. However, the present invention is not limited to the following Examples.

As used in Examples and Comparative Examples below, "%" and "part" represents "% by mass" and "part by mass" unless otherwise stated.

First, the methods for evaluation of vinyl chloride polymers (vinyl chloride resins) in Examples are shown below.
Evaluation of Vinyl Chloride Polymer The vinyl chloride polymer was evaluated as follows in terms of the average particle diameter, the amount of attached scale, the amount of coarse particles contained, the bulk specific gravity, the plasticizer absorption, the fish eye, and the initial discoloration.
Mean Particle Diameter and Amount of Coarse Particles Contained Particle size distribution was measured with a low tap sieve shaker (using a JIS sieve) and the mean particle diameter was obtained. The amount of the coarse particles with a particle size of on 60 mesh was obtained from the measured particle size distribution and represented in percentage (%). A smaller percentage means fewer coarse particles and a sharper particle size distribution of the vinyl chloride polymer, and a higher polymerization stability. The amount is shown in the column of "on #60" in Tables 2 and 4 below.
Amount of Attached Scale After the polymer slurry was discharged from the polymerization tank, the scale adhesion on the inner wall of the polymerization tank was visually observed and evaluated based on the following criteria.
Excellent: Almost no scale adhesion is observed
Good: Less scale adhesion is observed
Poor: Remarkable adhesion of white scale is observed
Bulk Specific Gravity The bulk specific gravity was measured in accordance with JIS K-6721. A higher bulk specific gravity means a faster extrusion rate and a superior processability.
Plasticizer Absorption In a cylindrical container having fiberglass placed in the bottom, the obtained resin was placed, and excessive dioctyl phthalate (hereinafter abbreviated as DOP) was added thereto. The mixture was left to stand for 30 minutes for infiltration of the DOP into the resin and subjected to centrifugal separation for removal of excess DOP. Then the weight of the resin was measured to calculate the amount of the DOP absorbed by 100 parts of the polymer. A larger amount of absorbed DOP means a higher plasticizer absorption and a higher molding processability.
Fish Eye At a temperature of 150° C., 100 parts of the obtained resin, 30 parts of dioctyl phthalate, 1 part of tribasic lead sulphate, 1.5 parts of lead stearate, 0.2 part of titanium dioxide, and 0.1 part of carbon black were melted and kneaded for 4 minutes, and a sheet having a thickness of 0.3 mm is produced. The number of fish eyes (transparent particles having a diameter of 0.4 mm or more) in 100 mm×100 mm of the obtained sheet was determined.
Initial Discoloration At a temperature of 150° C., 100 parts of the obtained resin, 2 parts of a Ba—Zn composite stabilizer, 2 parts of epoxidized soybean oil, and 38 parts of DOP were melted and kneaded for 10 minutes, and a sheet having a thickness of 0.8 mm is produced. Then, 7 pieces of the sheet were laminated and pressed at a temperature of 180° C. for 5 minutes to give a laminated sheet having a thickness of 5 mm. The transparency and initial discoloration of the laminated sheet were measured using a color and turbidity meter (COH-300A, manufactured by NIPPON DENSHOKU INDUSTRIES CO., LTD.) and evaluated with the yellowness index (YI).

Example 1

Synthesis for PVA-Based Polymer (A)

In a reaction tank provided with a stirrer, a condenser, a nitrogen gas introduction port, and an initiator feeding port, 450 parts of methanol and 550 parts of a vinyl acetate monomer were placed, and the system was heated to 60° C. while nitrogen gas was passed through the system. To the mixture, 25 parts of a 1% methanol solution of 2,2'-azobis (4-methoxy-2,4-dimethylvaleronitrile) was added as an initiator and polymerization was initiated.

During the polymerization, the system was maintained at a temperature of 60° C. Furthermore, while nitrogen gas was passed through the system, 35 parts of a 1% methanol solution of 2,2'-azobis(4-methoxy-2,4-dimethylvaleronitrile) was continuously added to the mixture over 4 hours from immediately after the polymerization initiation. Then, 4.5 hours after the polymerization initiation, when the reaction yield of vinyl acetate reached 85%, the system was cooled and the polymerization was terminated. The residual vinyl acetate monomer was evaporated off while methanol vapor was added to the obtained reaction product, and a 45% methanol solution of polyvinyl acetate was obtained.

Next, to 500 parts of the above-obtained 45% methanol solution of polyvinyl acetate, 70 parts of methyl acetate and 30 parts of a 3% methanol solution of sodium hydroxide were added. The mixture was stirred well and subjected to saponification at a temperature of 40° C. The obtained gelatinous substance was crushed to pieces and then dried to give a powder of a PVA-based polymer (A) having a saponification degree of 72.0 mol %, an average polymerization degree of 800, and a block character of 0.39.

Synthesis of PVA-Based Polymer (B)

In a solution of 1 part by weight of acrolein dissolved in 400 parts by weight of methanol, 100 parts by weight of the above-obtained PVA-based polymer (A) powder was immersed for 60 minutes, and then 25 parts by weight of a 1N hydrochloric acid aqueous solution was added to the mixture. The reaction was allowed to proceed at a temperature of 40° C. for 2 hours. Then, the mixture was neutralized with 25 parts by weight of a 1N sodium hydroxide aqueous solution. The resulting mixture was subjected to centrifugal separation for removal of the solvent and then dried at a temperature of 80° C. under a nitrogen atmosphere for 4 hours, to give a PVA-based polymer (B). The analysis of the PVA-based polymer (B) showed that the PVA-based polymer (B) had a saponification degree of 72.5 mol %, a polymerization degree of 800, and a block character of 0.41. Moreover, when the PVA-based polymer (B) dissolved in a d6-DMSO solvent was subjected to measurement by 1H-NMR spectroscopy, signals derived from a double bond was observed at 5.8, 5.4, and 5.2 ppm. The modification rate of the PVA-based polymer (B) modified by acrolein calculated from the signal strength was 0.9 mol %.

Suspension Polymerization of Vinyl Chloride

Suspension polymerization of vinyl chloride was performed using the above-obtained PVA-based polymer (B) as a dispersion stabilizer under the conditions described below.

In a pressure-proof stainless vessel for polymerization, 900 parts of deionized water and 0.5 part of the above-obtained PVA-based polymer (B) were placed. The pressure inside the vessel was reduced with a vacuum pump to 50 mmHg for deaeration, 700 parts of a vinyl chloride monomer was added, and 0.42 part of t-butyl peroxyneodecanoate was further added as a polymerization initiator. The resulting mixture was stirred and the temperature was raised. Suspension polymerization was performed while the content in the polymerization vessel was maintained at a temperature of 57° C., and at the time when the polymerization conversion rate of the vinyl chloride reached 88%, the polymerization was terminated. The unreacted monomer was collected with a vacuum trap, and then a polymer slurry was discharged from the polymerization vessel, dehydrated, and dried to give a vinyl chloride polymer (a vinyl chloride resin). The evaluation results of the obtained vinyl chloride polymer are shown in Table 2.

Examples 2 to 9

Suspension polymerization of vinyl chloride was performed in a similar manner to that in Example 1, using PVA-based polymer (B) synthesized in a similar manner to that in Example 1 except that a monoaldehyde having an unsaturated double bond shown in Table 1 was used, to give a vinyl chloride polymer. The evaluation results of the obtained vinyl chloride polymers are shown in Table 2.

Examples 10 to 13

Suspension polymerization of vinyl chloride was performed in a similar manner to that in Example 1, using PVA-based polymer (B) synthesized in a similar manner to that in Example 1 except that PVA-based polymer (A) synthesized in a similar manner to that in Example 1 except that the amount of methanol used for polymerization, the amount of 2,2'-azobis(4-methoxy-2,4-dimethylvaleronitrile) added, the reaction yield, and the amounts of methyl acetate and sodium hydroxide solution used for saponification were changed appropriately so that PVA-based polymer (A) having a polymerization degree, a saponification degree, and a block character shown in Table 1 can be obtained, and a monoaldehyde having an unsaturated double bond shown in Table 1 were used, to give a vinyl chloride polymer. The evaluation results of the obtained vinyl chloride polymers are shown in Table 2.

Examples 14 and 15

Suspension polymerization of vinyl chloride was performed in a similar manner to that in Example 1, using a PVA-based polymer (B) synthesized in a similar manner to that in Example 1 except that a PVA-based polymer (A) synthesized in a similar manner to that in Example 1 except that acetaldehyde was used as a chain transfer agent in polymerization and that the amount of methanol used, the amount of vinyl acetate used, the amount of 2,2'-azobis(4-methoxy-2,4-dimethylvaleronitrile) added, the reaction yield, and the amounts of methyl acetate and sodium hydroxide solution used for saponification were changed appropriately so that a PVA-based polymer (A) having a polymerization degree, a saponification degree, and a block character shown in Table 1 can be obtained, and a monoaldehyde having an unsaturated double bond shown in Table 1 were used, to give a vinyl chloride polymer. The evaluation results of the obtained vinyl chloride polymers are shown in Table 2.

TABLE 1

| | PVA (A) | | | | Monoaldehyde having unsaturated double bond | | PVA (B) | | |
|---|---|---|---|---|---|---|---|---|---|
| | Polymerization degree | Saponification degree mol % | Block character | Modification etc. | Type | Modification rate mol % | Polymerization degree | Saponification degree mol % | Block character |
| Example 1 | 800 | 72.0 | 0.39 | — | Acrolein | 0.9 | 800 | 72.5 | 0.41 |
| Example 2 | 800 | 72.0 | 0.39 | — | Acrolein | 0.1 | 800 | 72.3 | 0.40 |
| Example 3 | 800 | 72.0 | 0.39 | — | Acrolein | 6 | 800 | 72.9 | 0.42 |
| Example 4 | 800 | 72.0 | 0.39 | — | Crotonaldehyde | 1.2 | 800 | 72.6 | 0.41 |

TABLE 1-continued

| | PVA (A) | | | | Monoaldehyde having unsaturated double bond | | PVA (B) | | |
|---|---|---|---|---|---|---|---|---|---|
| | Polymerization degree | Saponification degree mol % | Block character | Modification etc. | Type | Modification rate mol % | Polymerization degree | Saponification degree mol % | Block character |
| Example 5 | 800 | 72.0 | 0.39 | — | Methacrolein | 0.5 | 800 | 72.4 | 0.41 |
| Example 6 | 800 | 72.0 | 0.39 | — | Cinnamaldehyde | 0.7 | 800 | 72.5 | 0.41 |
| Example 7 | 800 | 72.0 | 0.39 | — | Citral | 0.8 | 800 | 72.5 | 0.41 |
| Example 8 | 800 | 72.0 | 0.39 | — | 2,4-hexadienal | 0.8 | 800 | 72.5 | 0.41 |
| Example 9 | 800 | 72.0 | 0.39 | — | Trans-2-hexenal | 0.8 | 800 | 72.5 | 0.41 |
| Example 10 | 2200 | 80.0 | 0.41 | — | Crotonaldehyde | 1 | 2200 | 80.5 | 0.43 |
| Example 11 | 2400 | 88.0 | 0.44 | — | Crotonaldehyde | 9 | 2400 | 88.2 | 0.45 |
| Example 12 | 2000 | 98.5 | 0.46 | — | Crotonaldehyde | 13 | 1700 | 98.6 | 0.47 |
| Example 13 | 600 | 80.0 | 0.38 | — | Crotonaldehyde | 0.3 | 600 | 80.6 | 0.39 |
| Example 14 | 400 | 70.0 | 0.37 | Acetaldehyde | Crotonaldehyde | 1.1 | 400 | 72.4 | 0.38 |
| Example 15 | 800 | 72.0 | 0.39 | Acetaldehyde | Acrolein | 0.9 | 800 | 72.5 | 0.41 |
| Example 16 | 800 | 72.0 | 0.39 | Acetaldehyde | Acrolein | 0.9 | 800 | 72.7 | 0.42 |
| Example 17 | 800 | 72.0 | 0.39 | Acetaldehyde | Acrolein | 0.9 | 800 | 72.1 | 0.40 |
| Comparative Example 1 | 800 | 72.0 | 0.39 | — | — | — | — | — | — |
| Comparative Example 2 | 800 | 72.0 | 0.39 | Acetaldehyde | — | — | — | — | — |
| Comparative Example 3 | 2200 | 80.0 | 0.41 | — | — | — | — | — | — |
| Comparative Example 4 | 2400 | 88.0 | 0.44 | — | — | — | — | — | — |
| Comparative Example 5 | 2000 | 98.5 | 0.46 | — | — | — | — | — | — |
| Comparative Example 6 | 400 | 70.0 | 0.37 | Acetaldehyde | — | — | — | — | — |
| Comparative Example 7 | 760 | 71.5 | 0.51 | See Column A in Patent Literature 1 | — | — | — | — | — |
| Comparative Example 8 | 700 | 70.0 | 0.45 | See Example 1 in Patent Literature 6 | — | — | — | — | — |

TABLE 2

| | Vinyl chloride polymer | | | | | | |
|---|---|---|---|---|---|---|---|
| | Average particle diameter μm | Amount of attached scale | On #60 % | Bulk specific gravity g/mL | Plasticizer absorption % | Fish eye No. of fish eyes | YI |
| Example 1 | 144 | Excellent | 0.2 | 0.53 | 24 | 3 | 17.5 |
| Example 2 | 159 | Good | 0.5 | 0.52 | 25 | 5 | 19 |
| Example 3 | 132 | Excellent | 0.1 | 0.55 | 23 | 2 | 18 |
| Example 4 | 146 | Excellent | 0.3 | 0.54 | 23 | 3 | 18.5 |
| Example 5 | 151 | Excellent | 0.5 | 0.53 | 24 | 4 | 19 |
| Example 6 | 155 | Excellent | 0.5 | 0.53 | 24 | 5 | 19 |
| Example 7 | 154 | Excellent | 0.5 | 0.53 | 24 | 5 | 19 |
| Example 8 | 151 | Excellent | 0.4 | 0.54 | 23 | 4 | 19 |
| Example 9 | 149 | Excellent | 0.3 | 0.54 | 23 | 3 | 19 |
| Example 10 | 132 | Excellent | 0.1 | 0.55 | 22 | 2 | 18.5 |
| Example 11 | 144 | Excellent | 0.4 | 0.56 | 21 | 5 | 18 |
| Example 12 | 150 | Excellent | 0.5 | 0.58 | 22 | 5 | 19 |
| Example 13 | 120 | Excellent | 0.0 | 0.52 | 25 | 1 | 17.5 |
| Example 14 | 126 | Excellent | 0.0 | 0.52 | 27 | 1 | 17 |
| Example 15 | 122 | Excellent | 0.0 | 0.53 | 24 | 1 | 18 |
| Example 16 | 123 | Excellent | 0.0 | 0.53 | 25 | 1 | 18 |
| Example 17 | 124 | Excellent | 0.0 | 0.53 | 25 | 1 | 17.5 |
| Comparative Example 1 | Vinyl chloride was blocked and polymerization resulted in failure. | | | | | | |
| Comparative Example 2 | 205 | Poor | 15.6 | 0.53 | 20 | 35 | 22 |
| Comparative Example 3 | 175 | Poor | 2.2 | 0.55 | 19 | 15 | 20 |
| Comparative Example 4 | 210 | Poor | 13.5 | 0.56 | 15 | 180 | 21 |
| Comparative Example 5 | Vinyl chloride was blocked and polymerization resulted in failure. | | | | | | |
| Comparative Example 6 | 174 | Poor | 3.5 | 0.50 | 26 | 19 | 21 |

TABLE 2-continued

| | Vinyl chloride polymer | | | | | | |
|---|---|---|---|---|---|---|---|
| | Average particle diameter μm | Amount of attached scale | On #60 % | Bulk specific gravity g/mL | Plasticizer absorption % | Fish eye No. of fish eyes | YI |
| Comparative Example 7 | 172 | Good | 2.5 | 0.55 | 17 | 20 | 30 |
| Comparative Example 8 | 198 | Poor | 14.5 | 0.55 | 19 | 30 | 23 |

Example 16

In a solution of 1 part by weight of acrolein dissolved in 500 parts by weight of methanol, 100 parts by weight of the same PVA-based polymer (A) powder as in Example 15 was immersed for 40 minutes, and then 6.5 parts by weight of a 50% by weight methanol solution of p-toluenesulfonic acid was added to the mixture. The reaction was allowed to proceed at a temperature of 40° C. for 2 hours. Then, the mixture was neutralized with 7.5 parts by weight of a 10% by weight sodium hydroxide aqueous solution. The resulting mixture was subjected to centrifugal separation for removal of the solvent and then dried at a temperature of 80° C. under a nitrogen atmosphere for 4 hours, to give a PVA-based polymer (B). The analysis of the PVA-based polymer (B) showed that the PVA-based polymer (B) had a saponification degree of 72.7 mol %, a polymerization degree of 800, and a block character of 0.42. Moreover, when the PVA-based polymer (B) dissolved in a d6-DMSO solvent was subjected to measurement by 1H-NMR spectroscopy, signals derived from a double bond was observed at 5.8, 5.4, and 5.2 ppm. The amount of PVA-based polymer (B) modified by acrolein calculated from the signal strength was 0.9 mol %.

Suspension polymerization of vinyl chloride was performed using the above-mentioned PVA-based polymer (B) as a dispersion stabilizer under the same conditions as in Example 1, to give a vinyl chloride polymer. The evaluation results of the obtained vinyl chloride polymer are shown in Table 2.

Example 17

To 100 parts by weight of a 10% by weight aqueous solution of the same PVA-based polymer (A) as in Example 15, 0.1 part by weight of acrolein was added, and 0.65 part by weight of a 50% by weight aqueous solution of p-toluenesulfonic acid was added to the mixture. The reaction was allowed to proceed at a temperature of 40° C. for 2 hours. Then, the mixture was neutralized with 0.75 part by weight of a 10% by weight sodium hydroxide aqueous solution to give a PVA-based polymer (B) aqueous solution. The analysis of the PVA-based polymer (B) showed that the PVA-based polymer (B) had a saponification degree of 72.1 mol %, a polymerization degree of 800, and a block character of 0.40. Moreover, when the PVA-based polymer (B) dissolved in a d6-DMSO solvent was subjected to measurement by 1H-NMR spectroscopy, signals derived from a double bond was observed at 5.8, 5.4, and 5.2 ppm. The amount of PVA-based polymer (B) modified by acrolein calculated from the signal strength was 0.9 mol %.

Suspension polymerization of vinyl chloride was performed using the above-mentioned PVA-based polymer (B) as a dispersion stabilizer under the same conditions as in Example 1, to give a vinyl chloride polymer. The evaluation results of the obtained vinyl chloride polymer are shown in Table 2.

As shown by the results of Examples 1 to 17, it was revealed that the dispersion stabilizer of the present invention exhibits an excellent polymerization stability when used in polymerization for a vinyl chloride resin, and allows formation of a vinyl chloride-based resin having few coarse particles, few fish eyes after resin molding, an excellent plasticizer absorption, and an excellent hue.

Comparative Examples 1 to 6

Suspension polymerization of vinyl chloride was performed in a similar manner to that in Example 1 except that a PVA-based polymer (A) powder was used as it was as a dispersion stabilizer instead of the PVA-based polymer (B) as shown in Table 1, to give a vinyl chloride polymer. In each of Comparative Examples 1 to 6, used was the PVA-based polymer (A) having an intended polymerization degree, saponification degree, and block character selected from the PVA-based polymers (A) used in Examples 1 to 16.

The evaluation results of the obtained vinyl chloride polymers are shown in Table 2. In Comparative Examples 1 and 5, vinyl chloride was blocked, polymerization resulted in failure, and therefore a vinyl chloride polymer was not obtained. In Comparative Examples 2 to 4 and 6, coarse particles were contained, uniform-sized polymer particles were not obtained, and a large amount of scale adhered, showing unstable polymerization. Moreover, a large number of fish eyes occurred and thus, an excellent vinyl chloride polymer was not obtained.

Comparative Example 7

Suspension polymerization of vinyl chloride was performed in a similar manner to that in Example 1 except that a PVA-based polymer (A) produced by the method in Column A in Example in Patent Literature 1 was used as a dispersion stabilizer instead of the PVA-based polymer (B) as shown in Table 1, to give a vinyl chloride polymer. The evaluation results of the obtained vinyl chloride polymer are shown in Table 2.

In Comparative Example 7, coarse particles were contained and uniform-sized polymer particles were not obtained, showing unstable polymerization. Moreover, poor plasticizer absorption and bad hue were exhibited, a large number of fish eyes occurred, and thus, an excellent vinyl chloride polymer was not obtained.

Comparative Example 8

Suspension polymerization of vinyl chloride was performed in a similar manner to that in Example 1 except that a PVA-based polymer (A) which has been esterified with a carboxylic acid having an unsaturated double bond and produced by the method described in Example 1 in Patent Literature 6 was used as a dispersion stabilizer instead of the PVA-based polymer (B) as shown in Table 1, to give a vinyl chloride polymer. The evaluation results of the obtained vinyl chloride polymer are shown in Table 2.

In Comparative Example 8, coarse particles were contained, uniform-sized polymer particles were not obtained, and a large amount of scale adhered, showing unstable polymerization. Moreover, a large number of fish eyes occurred and thus, an excellent vinyl chloride polymer was not obtained.

Examples 18 and 19

Suspension polymerization of vinyl chloride was performed under the conditions described below using a PVA-based polymer (B) synthesized in a similar manner to that in Example 16 except that the same PVA-based polymer (A) as in Example 15 and a monoaldehyde having an unsaturated double bond shown in Table 3 were used.

In a polymerization vessel (a pressure-proof autoclave) having an internal volume of 100 L, 45 kg of deionized water was placed, and 700 ppm of a PVA-based polymer (B) of the present invention shown in Table 3, 100 ppm of a partially saponified polyvinyl alcohol (saponification degree: 88 mol %, polymerization degree: 2400), 150 ppm of a partially saponified polyvinyl alcohol (saponification degree: 55 mol %, polymerization degree: 220), and 500 ppm of t-butyl peroxyneodecanoate were further added, relative to the vinyl chloride monomer. The pressure inside the vessel was reduced to 40 mmHg for deaeration, then 45 kg of the vinyl chloride monomer was added, and the mixture was stirred. The polymerization temperature was set at 57° C. and the temperature was maintained until the end of the polymerization.

At the time when the polymerization conversion rate reached 90%, the polymerization was terminated. The unreacted monomer in the vessel was collected, and then a polymer slurry was discharged outside the system, dehydrated, and dried to give a vinyl chloride polymer. The evaluation results of the vinyl chloride polymers are shown in Table 4.

Example 20

Suspension polymerization of vinyl chloride was performed in a similar manner to that in Example 18, using a PVA-based polymer (B) synthesized in a similar manner to that in Example 16, using the same PVA-based polymer (A) as in Example 14 and a monoaldehyde having an unsaturated double bond shown in Table 3, to give a vinyl chloride polymer. The evaluation results of the obtained vinyl chloride polymer are shown in Table 4.

TABLE 3

| | PVA (A) | | | | Monoaldehyde having unsaturated double bond | | PVA (B) | | |
| --- | --- | --- | --- | --- | --- | --- | --- | --- | --- |
| | Polymerization degree | Saponification degree mol % | Block character | Modification etc. | Type | Modification rate mol % | Polymerization degree | Saponification degree mol % | Block character |
| Example 18 | 800 | 72.0 | 0.39 | Acetaldehyde | Acrolein | 0.5 | 800 | 72.5 | 0.42 |
| Example 19 | 800 | 72.0 | 0.39 | Acetaldehyde | Methacrolein | 1.5 | 800 | 72.6 | 0.42 |
| Example 20 | 400 | 70.0 | 0.37 | Acetaldehyde | Crotonaldehyde | 4 | 400 | 72.3 | 0.39 |
| Comparative Example 9 | 800 | 72.0 | 0.39 | — | — | — | — | — | — |
| Comparative Example 10 | 800 | 72.0 | 0.39 | Acetaldehyde | — | — | — | — | — |
| Comparative Example 11 | 760 | 71.5 | 0.51 | See Column A in Patent Literature 1 | — | — | — | — | — |
| Comparative Example 12 | 700 | 70.0 | 0.45 | See Example 1 in Patent Literature 6 | — | — | — | — | — |
| Example 21 | 2200 | 80.0 | 0.41 | — | Crotonaldehyde | 1 | 2200 | 80.5 | 0.43 |
| Example 22 | 2400 | 88.0 | 0.44 | — | Crotonaldehyde | 9 | 2400 | 88.2 | 0.45 |
| Comparative Example 13 | 2200 | 80.0 | 0.41 | — | — | — | — | — | — |
| Comparative Example 14 | 2400 | 88.0 | 0.44 | — | — | — | — | — | — |

TABLE 4

| | Vinyl chloride polymer | | | | | | |
| --- | --- | --- | --- | --- | --- | --- | --- |
| | Average particle diameter μm | Amount of attached scale | On #60 % | Bulk specific gravity g/mL | Plasticizer absorption % | Fish eye No. of fish eyes | YI |
| Example 18 | 144 | Excellent | 0.0 | 0.54 | 30 | 1 | 17 |
| Example 19 | 159 | Excellent | 0.0 | 0.55 | 29 | 1 | 17 |
| Example 20 | 132 | Excellent | 0.0 | 0.54 | 31 | 0 | 17 |
| Comparative example 9 | Vinyl chloride was blocked and polymerization resulted in failure. | | | | | | |

TABLE 4-continued

| | Vinyl chloride polymer | | | | | | |
|---|---|---|---|---|---|---|---|
| | Average particle diameter μm | Amount of attached scale | On #60 % | Bulk specific gravity g/mL | Plasticizer absorption % | Fish eye No. of fish eyes | YI |
| Comparative example 10 | 202 | Poor | 15.6 | 0.52 | 26 | 10 | 20 |
| Comparative example 11 | 170 | Good | 2.8 | 0.58 | 24 | 15 | 29 |
| Comparative example 12 | 198 | Poor | 14.0 | 0.52 | 26 | 20 | 23 |
| Example 21 | 128 | Excellent | 0.0 | 0.55 | 29 | 1 | 18 |
| Example 22 | 137 | Excellent | 0.0 | 0.55 | 28 | 2 | 18 |
| Comparative example 13 | 177 | Poor | 4.4 | 0.56 | 23 | 9 | 21 |
| Comparative example 14 | 187 | Poor | 6.7 | 0.56 | 20 | 14 | 22 |

As shown by the results of Examples 18 to 20, it was revealed that the dispersion stabilizer of the present invention exhibits an excellent polymerization stability when used in polymerization for a vinyl chloride resin, and gives a vinyl chloride-based resin having few coarse particles, few fish eyes after resin molding, an excellent plasticizer absorption, and an excellent hue.

Comparative Examples 9 and 10

Suspension polymerization of vinyl chloride was performed in a similar manner to that in Example 18, using the same PVA-based polymer (A) powder as in Example 1 or 15 as it was as a dispersion stabilizer as shown in Table 3, to give a vinyl chloride polymer.

The evaluation results of the obtained vinyl chloride polymers are shown in Table 4. In Comparative Example 9, vinyl chloride was blocked, polymerization resulted in failure, and therefore a vinyl chloride polymer particle was not obtained. In Comparative Example 10, coarse particles were contained, uniform-sized polymer particles were not obtained, and a large amount of scale adhered, showing unstable polymerization. Moreover, a large number of fish eyes occurred and thus, an excellent vinyl chloride polymer was not obtained.

Comparative Example 11

Suspension polymerization of vinyl chloride was performed in a similar manner to that in Example 18, using a PVA-based polymer (A) produced by the method described in Column A in Example in Patent Literature 1 as a dispersion stabilizer as shown in Table 3, to give a vinyl chloride polymer.

The evaluation results of the obtained vinyl chloride polymer particle are shown in Table 4.

In Comparative Example 11, poor plasticizer absorption and bad hue were exhibited, coarse particles were contained, uniform polymer particles were not obtained, and a large number of fish eyes occurred. Thus, an excellent vinyl chloride polymer particle was not obtained.

Comparative Example 12

Suspension polymerization of vinyl chloride was performed in a similar manner to that in Example 18, using a PVA-based polymer (A) which has been esterified with a carboxylic acid having an unsaturated double bond and produced by the method described in Example 1 in Patent Literature 6 as a dispersion stabilizer as shown in Table 3, to give a vinyl chloride polymer.

The evaluation results of the vinyl chloride polymer particle are shown in Table 4.

In Comparative Example 12, coarse particles were contained, uniform-sized polymer particles were not obtained, and a large amount of scale adhered, showing unstable polymerization.

Examples 21 and 22

Suspension polymerization of vinyl chloride was performed using the same PVA-based polymer (B) as in Example 10 or 11 as shown in Table 3 under the conditions below.

In a polymerization vessel (a pressure-proof autoclave) having an internal volume of 100 L, 45 kg of deionized water was placed, and 550 ppm of a PVA-based polymer (B) of the present invention shown in Table 3, 250 ppm of a partially saponified polyvinyl alcohol (saponification degree: 72 mol %, polymerization degree: 700), 150 ppm of a partially saponified polyvinyl alcohol (saponification degree: 55 mol %, polymerization degree: 220), and 500 ppm of t-butyl peroxyneodecanoate were further added, relative to the vinyl chloride monomer. The pressure inside the vessel was reduced to 40 mmHg for deaeration, then 45 kg of the vinyl chloride monomer was added, and the mixture was stirred. The polymerization temperature was set at 57° C. and the temperature was maintained until the end of the polymerization.

At the time when the polymerization conversion rate reached 90%, the polymerization was terminated. The unreacted monomer in the vessel was collected, and then a polymer slurry was discharged outside the system, dehydrated, and dried to give a vinyl chloride resin. The evaluation results of the obtained vinyl chloride polymers are shown in Table 4.

As shown by Examples 21 and 22, it was revealed that the dispersion stabilizer of the present invention exhibits an excellent polymerization stability when used in suspension polymerization for a vinyl chloride-based resin, leading to reduction in blocking and scale adhesion caused by unstable polymerization, and gives vinyl chloride polymer particles having few coarse particles, a sharp particle size distribution, an excellent hue, and an excellent plasticizer absorption.

Comparative Examples 13 and 14

Suspension polymerization of vinyl chloride was performed in a similar manner to that in Example 21, using the same PVA-based polymer (A) powder as in Example 21 or 22 as it was as a dispersion stabilizer as shown in Table 3, to give a vinyl chloride polymer.

The evaluation results of the vinyl chloride polymer particles are shown in Table 4. In Comparative Examples 13 and 14, coarse particles were contained, uniform-sized polymer particles were not obtained, and a large amount of scale adhered, showing unstable polymerization. Moreover, a large number of fish eyes occurred and thus, an excellent vinyl chloride polymer was not able to be produced.

INDUSTRIAL APPLICABILITY

The dispersion stabilizer of the present invention exhibits an excellent polymerization stability when used in suspension polymerization for a vinyl chloride-based resin, leading to reduction in blocking and scale adhesion caused by unstable polymerization, and gives polymer particles having few coarse particles, a sharp particle size distribution, an excellent hue, and an excellent plasticizer absorption. Thus, the dispersion stabilizer of the present invention is significantly industrially useful.

The invention claimed is:

1. A dispersion stabilizer for suspension polymerization, comprising a polyvinyl alcohol-based polymer which has an olefinic unsaturated double bond in a side chain and a block character of 0.5 or less and which is obtainable by acetalization of a polyvinyl alcohol-based polymer with a monoaldehyde having an olefinic unsaturated double bond.

2. The dispersion stabilizer for suspension polymerization according to claim 1, wherein the modification rate of the polyvinyl alcohol-based polymer which has an olefinic unsaturated double bond in a side chain and which is modified by the monoaldehyde having an unsaturated double bond is 0.01 to 20 mol % per monomer unit of the polyvinyl alcohol-based polymer.

3. The dispersion stabilizer for suspension polymerization according to claim 1, wherein the polyvinyl alcohol-based polymer has a saponification degree of 60 to 99.9 mol % and an average polymerization degree of 300 to 5000.

4. A method for producing a vinyl polymer, the method comprising: conducting suspension polymerization of a vinyl-based monomer using the dispersion stabilizer for suspension polymerization according to claim 1.

5. A vinyl chloride resin produced by suspension polymerization of a vinyl chloride-based monomer using the dispersion stabilizer for suspension polymerization according to claim 1.

* * * * *